United States Patent [19]

Sjoholm et al.

[11] Patent Number: 5,228,301
[45] Date of Patent: Jul. 20, 1993

[54] METHODS AND APPARATUS FOR OPERATING A REFRIGERATION SYSTEM

[75] Inventors: Lars I. Sjoholm, Burnsville; Peter W. Freund, Bloomington; Sung L. Kwon, Burnsville; Lowell B. Naley, Minnetonka; Lee J. Erickson, Eagan; David H. Taylor, Minneapolis, all of Minn.

[73] Assignee: Thermo King Corporation, Minneapolis, Minn.

[21] Appl. No.: 919,799

[22] Filed: Jul. 27, 1992

[51] Int. Cl.⁵ .................. F25B 43/02; F25B 13/00
[52] U.S. Cl. ............................. 62/84; 62/160; 62/196.1; 62/323.1; 62/324.5; 165/30
[58] Field of Search ............ 62/84, 160, 196.1, 323.1, 62/324.5, 81; 165/30

[56] References Cited

U.S. PATENT DOCUMENTS

| | | | |
|---|---|---|---|
| 4,474,019 | 10/1984 | Albert | 62/84 |
| 4,748,831 | 6/1988 | Shaw | 62/505 |
| 4,758,136 | 7/1988 | Pamlin et al. | 418/15 |
| 4,773,229 | 9/1988 | Pamlin et al. | 62/84 |
| 4,819,441 | 4/1989 | Hanson | 62/160 |
| 4,850,197 | 7/1989 | Taylor et al. | 62/81 |
| 4,903,495 | 2/1990 | Howland et al. | 62/81 |
| 5,018,948 | 5/1991 | Sjtöholm et al. | 417/302 |
| 5,063,750 | 11/1991 | Englund | 62/196.3 |
| 5,174,123 | 12/1992 | Erickson | 62/113 |

FOREIGN PATENT DOCUMENTS

WO87/03048 5/1987 PCT Int'l Appl.
WO88/00294 1/1988 PCT Int'l Appl.

Primary Examiner—William E. Wayner
Attorney, Agent, or Firm—M. J. Moran

[57] ABSTRACT

A refrigeration system of the type having an economizer cycle is provided with a null cycle, in addition to heating and cooling cycles, without shutting a compressor prime mover down, to preserve air flow in a conditioned space. First, second and third controllable valves respectively: (1) select main and auxiliary condensers, (2) open and close a liquid line, and (3) open and close a line which provides a warm liquid to an economizer heat exchanger. The valves are controlled in at least one predetermined open/close pattern during a null cycle, and preferably in a plurality of selectable predetermined open/close patterns, to provide a null cycle at any instant which substantially matches the net heat gain or loss taking place in the conditioned space. Thus, the temperature of the served space will be more apt to remain in a null temperature range close to set point, providing smoother and more accurate control over the temperature of the conditioned space for longer shelf life of perishables stored therein.

40 Claims, 5 Drawing Sheets

METHODS AND APPARATUS FOR OPERATING A REFRIGERATION SYSTEM

TECHNICAL FIELD

The invention relates in general to refrigeration systems, and more specifically to refrigeration systems which utilize a compressor having an intermediate pressure port.

BACKGROUND ART

U.S. Pat. No. 4,850,197, which is assigned to the same assignee as the present application, discloses a vapor compression refrigeration system based on an economizer cycle which utilizes a refrigerant compressor having an intermediate pressure port, in addition to suction and discharge ports. An economizer heat exchanger is used to enhance hot gas cooling and heating cycles which are initiated by associated electrical or electronic control to achieve and maintain a predetermined temperature range close to a selected set point temperature in a served space to be conditioned.

Application Ser. No. 07/749,358, filed Aug. 23, 1991, now U.S. Pat. No. 5,174,123 entitled Methods and Apparatus For Operating A Refrigeration System, which application is assigned to the same assignee as the present application, discloses refrigeration methods and apparatus which utilize a flash tank in a refrigeration system which has an economizer cycle, in place of an economizer heat exchanger. The refrigeration arrangement disclosed in the aforesaid application eliminates the need for a float valve in the flash tank, enabling the flash tank to be used in transport refrigeration applications.

It would be desirable, and it is an object of the present application, to improve the reliability and efficiency, as well as the control methods and arrangements, of refrigeration systems which have an economizer cycle, such as the refrigeration systems disclosed in the hereinbefore mentioned patent and patent application.

SUMMARY OF THE INVENTION

The invention includes methods and apparatus for operating a refrigeration system which achieves and holds a predetermined set point temperature in a conditioned space via cooling and heating cycles. The refrigeration system includes a refrigerant compressor having a suction port, an intermediate pressure port, a discharge port, and a compressor prime mover. The refrigeration system further includes a hot gas compressor discharge line, first and second hot gas lines, and first controllable valve means having first and second positions which respectively connect the hot gas compressor discharge line to the first and second hot gas lines. A main condenser is connected to the first hot gas line. An evaporator, which is associated with the conditioned space, includes an evaporator expansion valve. An auxiliary condenser is associated with the conditioned space, with the auxiliary condenser being connected to the second hot gas line. Economizer heat exchanger means having first and second refrigerant flow paths is provided, including an economizer expansion valve which controls the rate of refrigerant flow through the second refrigerant flow path. A main liquid line connects the main condenser to the evaporator expansion valve via the first refrigerant flow path of the economizer heat exchanger means, an auxiliary liquid line connects the auxiliary condenser to the economizer heat exchanger means, a main suction line connects the evaporator to the suction port of the compressor, and an auxiliary suction line connects the second flow path of the economizer heat exchanger means to the intermediate pressure port of the compressor. Second controllable valve means having first and second positions is disposed to block and unblock the main liquid line, and third controllable valve means is disposed to selectively add heat to the economizer heat exchanger means.

At least one predetermined null related pattern of open/closed valve positions for the first, second and third controllable valve means is provided, and a null cycle or null operating mode is initiated when the temperature of the conditioned space is in a predetermined null temperature range adjacent to the predetermined set point temperature while maintaining operation of the refrigerant compressor. The initiation of the null operating mode includes selecting the at least one predetermined null associated pattern of open/closed valve positions.

In a preferred embodiment of the invention, a plurality of predetermined patterns of valve positions are provided, each implementing a slightly different null operating mode. At any given instant a null related controllable valve position pattern is selected which will result in the net heat gain or loss of the conditioned space being substantially matched by the heat added to or removed from the conditioned space by the evaporator and auxiliary condenser.

Another embodiment of the invention includes providing a refrigerant vent orifice which automatically drains refrigerant from a heating related circuit to a low pressure part of a cooling circuit, during each cooling cycle. A preferred location for the vent orifice connects one end at a junction between the auxiliary condenser and a drain pan heating coil, and the other end is connected either to a refrigerant distributor which distributes refrigerant to the evaporator coil, or to a main suction line downstream from an evaporator coil. These connection points are preferred as only a short length of tubing is required, and the location provides defrosting of the vent orifice tubing during a defrost cycle.

In another embodiment of the invention, the economizer heat exchanger means provides the second refrigerant path via an outer shell or housing having an inlet and an outlet, with the shell surrounding the first refrigerant path. Refrigerant is expanded into the shell via the economizer expansion valve, to provide refrigerant expansion of the flooded type, as no super heating exists with this configuration. A refrigerant and compressor oil drain line is connected from a low point of the shell to a selected one of two locations. The first location is a still lower point of the auxiliary suction line which interconnects the outlet of the shell to the intermediate pressure port of the compressor. The second location is to a higher point of the auxiliary suction line than the drain elevation. A "lift" of the oil-liquid refrigerant mixture is provided by running the drain line vertically along, and in heat exchange relation with, a section of the liquid line to create a percolator effect. This drain line provides two advantages. By removing compressor oil which has been carried into the shell of the economizer heat exchanger means, which oil is at least partially miscible with liquid refrigerant, the oil concentration in the boiling refrigerant in the shell is reduced, resulting in a dramatic increase in the heat transfer characteristic between the first and second refrigerant flow paths. Depending upon the current running condition this increase is usually between 20% and 60%. By metering the flow of liquid refrigerant from the shell back to the intermediate pressure port of the compressor, an evaporation of refrigerant occurs in the compressor which cools the compressor and thus limits the discharge temperature of the compressor.

In still another embodiment of the invention compressor discharge pressure and load on the compressor prime mover are kept within desirable limits without causing either a heating cycle or a cooling cycle to suffer, and without adding another restrictive valve to the system, by using maximum operating pressure (MOP) expansion valves for both the evaporator expansion valve and for the economizer expansion valve. The MOP evaporator expansion valve controls the operating pressure during a cooling cycle, and the MOP economizer expansion valve controls the operating pressure during a heating/defrost cycle. Thus, the maximum operating pressure setting for each MOP valve is selected for the specific cycle it is associated with, with the setting on one MOP expansion valve applying no restriction on capacity during a cycle in which the other MOP expansion valve is in control.

In another embodiment of the invention, an economizer by-pass valve is connected between the auxiliary and main suction lines, and in addition to operating the valve in a conventional manner, e.g., open during a heating/defrost cycle, and either closed during a cooling cycle, or controlled to provide compressor unloading during a cooling cycle for temperature control of a conditioned space, it is used to provide engine load management, which is especially required during high ambient temperatures. The load on the prime mover is monitored, such as by monitoring compressor discharge temperature, or by monitoring the temperature of the prime mover, and the by-pass valve is additionally controlled as a function of the detected load. When a certain load is reached, the by-pass valve is opened, and when the load drops to a predetermined value, the valve is closed.

In still further embodiments of the invention, which embodiments relate to when the compressor is driven by a liquid cooled engine, and to a compressor which has an external oil cooler cooled by the engine coolant, the connection of the oil cooler in the engine coolant circuit is selected according to the type of thermostat used in the engine coolant circuit. When a thermostat of the choke type is used, i.e., a thermostat which has a single inlet and a single outlet, and which is practically closed below a predetermined temperature, the oil cooler is connected on the upstream side of the input to the thermostat. Thus, there is coolant flow to the oil cooler even when the thermostat is closed. When the thermostat is of the by-pass type, i.e., a thermostat with two inputs and a single outlet, with the thermostat controlling the percentage of flow into the two inlets, the oil cooler is located downstream from the outlet, again assuring a constant flow of coolant, regardless of the regulating action of the by-pass thermostat at any instant.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
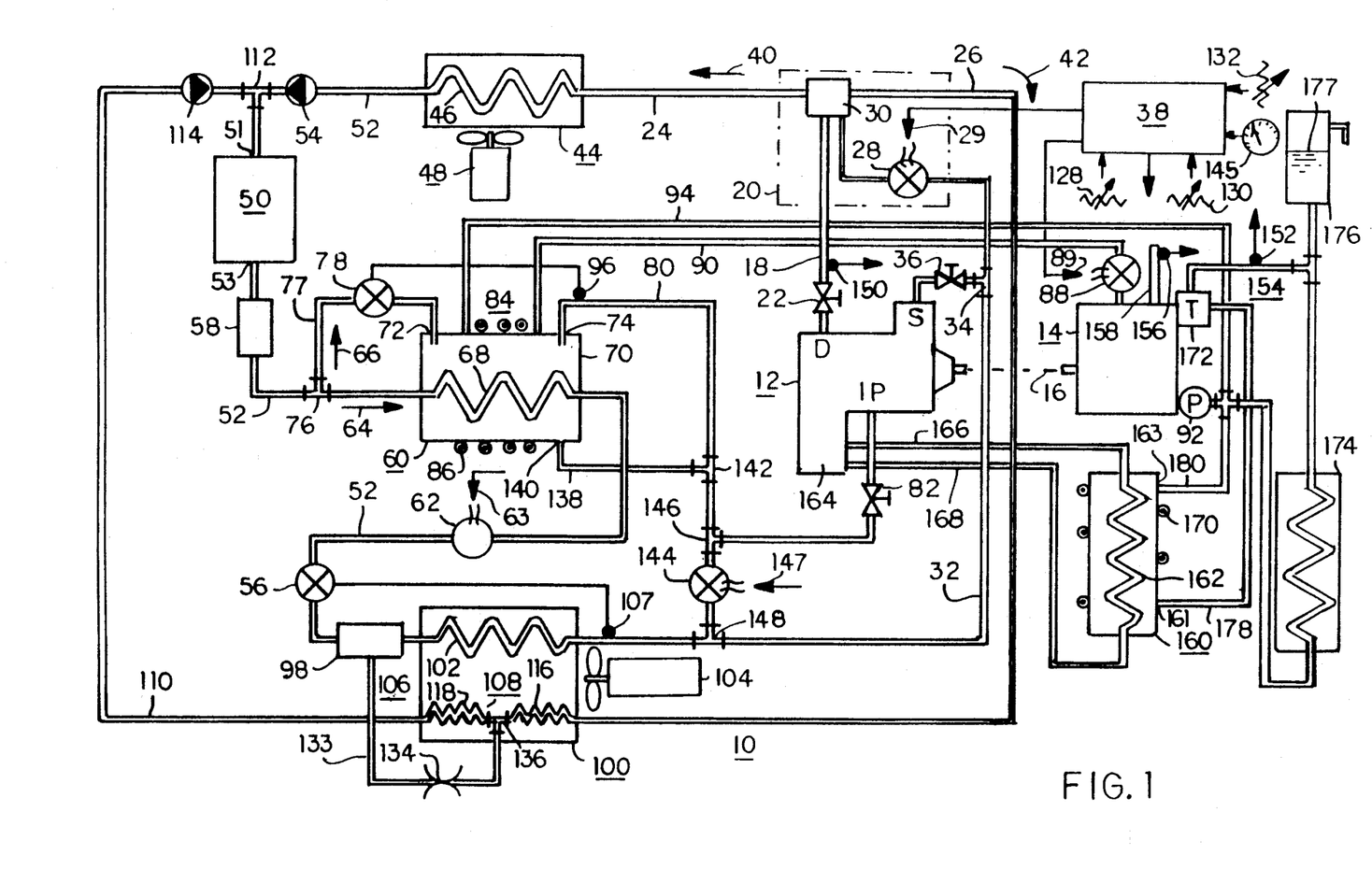
FIG. 1 illustrates a refrigeration system constructed according to the teachings of the invention, with the refrigeration system having an economizer cycle.

As used in the following description and claims, the term "conditioned space" includes any space to be temperature and/or humidity controlled, including stationary and transport applications, for the preservation of foods and other perishables, maintenance of a proper atmosphere for the shipment of industrial products, space conditioning for human comfort, and the like. The term "refrigeration system" is used to generically cover both air conditioning systems for human comfort, and refrigeration systems for preservation of perishables and shipment of industrial products. When it is stated that the temperature of a conditioned space is controlled to a selected set point temperature, it is to be understood that the temperature of the conditioned space is controlled to a predetermined temperature range adjacent to the selected set point temperature. In FIG. 1, controllable valves which are normally open (n.o.) are illustrated with an empty circle, and controllable valves which are normally closed (n.c.) are illustrated with an "X" within a circle. Of course, the associated electrical or electronic control, hereinafter called "electrical control", may be changed to reverse the de-energized states shown. An arrow pointed toward a valve in FIG. 1 indicates that the valve is controlled by the associated electrical control.

Referring now to the drawings, and to FIG. 1 in particular, there is shown a refrigeration system 10 constructed according to the teachings of the invention. Refrigeration system 10 is of the type having an economizer cycle, including a refrigerant compressor 12 having a suction port S, a discharge port D, and an intermediate pressure port IP. Compressor 12 is driven by a prime mover 14, which, in a preferred embodiment of the invention, includes a liquid cooled internal combustion engine, such as a diesel engine, linked to compressor 12 as indicated generally by broken line 16. Prime mover 14 may also include an electric motor, as the sole prime mover, or as a stand-by prime mover.

A compressor hot gas discharge line 18 connects the discharge port D of compressor 12 to first controllable valve means 20 via a discharge service valve 22. The first controllable valve means 20 connects the compressor hot gas discharge line 18 to a selected one of first and second hot gas lines 24 and 26. As illustrated in FIG. 1, the first controllable valve means 20 may include a n.c. pilot solenoid valve 28 and a three-way valve 30. Pilot solenoid valve 28 selectively connects the low pressure side of compressor 12 to the three-way valve 30, such as by tapping a main suction line 32 via a tee 34, with the main suction line 32 being connected to the suction port S of compressor 12 via a suction line service valve 36. Pilot solenoid valve 28 is operably controlled by electrical control 38 via means indicated generally by arrow 29. When pilot solenoid valve 28 is de-energized and thus closed, three-way valve 30 interconnects the compressor hot gas discharge line 18 to the first hot gas line 24, and when electrical control 38 energizes and opens pilot solenoid valve 28, three-way valve 30 is operated by compressor pressure to interconnect compressor hot gas discharge line 18 to the second hot gas line 26.

The first and second hot gas lines 24 and 26 respectively direct hot compressor discharge gas to cooling and heating circuits 40 and 42. The cooling circuit 40 includes main refrigerant condenser means 44 which includes a condenser coil 46 and condenser air mover means 48. The first hot gas line 24 is connected to an inlet side of condenser coil 46, and an outlet side is connected to an inlet 51 of a refrigerant receiver 50 via a main liquid line 52 which includes a check valve 54. The cooling circuit 40 and main liquid line 52 continues from an outlet 53 of receiver 50 to an inlet side of an evaporator expansion valve 56, via a refrigerant dehydrator or dryer 58, economizer heat exchanger means 60, and second controllable valve means 62, such as a n.o. solenoid valve operably controlled by electrical control 38 via means indicated generally by arrow 63.

Economizer heat exchanger means 60 includes first and second refrigerant flow paths 64 and 66, respectively, with the first refrigerant flow path 64 including a heat exchanger coil 68 in the liquid line 52. The second refrigerant flow path 66 includes a shell or housing 70 disposed to surround heat exchanger coil 68, with shell 70 having a refrigerant inlet 72 and a refrigerant outlet 74. The second flow path 66 taps the main liquid line 52 via a tee 76 and a conduit 77, with an economizer expansion valve 78 being connected in conduit 77 between tee 76 and shell inlet 72 Thus, a portion of the liquid refrigerant flowing through the main liquid line 52 is diverted through the economizer expansion valve 78 into the second refrigerant flow path 66, expanding refrigerant into shell 70 and providing an economizer cycle by subcooling liquid refrigerant flowing through heat exchanger coil 68. Shell outlet 74 is connected to the intermediate pressure port IP of compressor 12 via an auxiliary suction line 80 and a service valve 82. Refrigerant in shell 70 is at a higher pressure than refrigerant returning to suction port S of compressor 12, and is thus returned to the higher pressure intermediate port IP.

Economizer heat exchanger means 60 also includes heating means 84 for selectively adding heat to the refrigerant flowing through economizer heat exchanger means 60. Heating means 84, in a preferred embodiment of the invention in which the prime mover 14 includes a liquid cooled internal combustion engine, includes a heating or water jacket 86 connected to receive liquid coolant from prime mover 14 via third controllable valve means 88, which may be a n.c. solenoid valve operably controlled by electrical control 38 via means indicated generally by arrow 89. Liquid coolant from a liquid coolant circuit associated with prime mover 14 enters an inlet side of water jacket 86 via a first liquid flow conduit 90, and liquid coolant is returned from water jacket 86 to a water pump 92 via a second liquid flow conduit 94. Valve 88 and conduit 90 tap the liquid circuit of the prime mover 14 without going through a thermostat T associated with prime mover 14. Refrigerant flow rate through the second refrigerant flow path 66 is controlled by the economizer expansion valve 78 as a function of the refrigerant temperature at the outlet 74, as indicated by thermal bulb 96.

When prime mover 14 is an electric motor, heating jacket 86, instead of being a water jacket, may be an electrical resistance coil, with the third controllable valve means 88 being replaced by an on/off switch. Also, while heat is preferably added to the external side of shell 70, it is to be understood that liquid coolant may be directed to a heat exchanger coil disposed within shell 70, and electrical resistors, instead of heating the external side of shell 70, may be disposed within shell 70.

The cooling circuit 40 continues from evaporator expansion valve 56, which separates high and low pressure sides of the cooling circuit 40, via a refrigerant distributor 98 which distributes refrigerant to evaporator means 100. Evaporator means 100 includes an evaporator coil 102, which has a plurality of flow paths receiving refrigerant from distributor 98, and evaporator air mover means 104. Air mover means 104 circulates air between a conditioned space, indicated generally at 106, and the evaporator coil 102. An outlet side of evaporator coil 102 is connected to the hereinbefore mentioned main suction line 32, to return refrigerant to suction port S of compressor 12. The flow through the first flow path 64 of economizer heat exchanger means 60 is thus controlled by the evaporator expansion valve 56, which controls flow rate according to the degree of superheat in the refrigerant vapors leaving evaporator coil 102, as indicated by thermal bulb 107.

The heating circuit 42 includes the second hot gas line 26, an auxiliary condenser 108, and an auxiliary liquid line 110. Auxiliary condenser 108 is associated with evaporator means 100 and is thus also in heat exchange relation with conditioned space 106. The second hot gas line 26 is connected to an inlet side of auxiliary condenser 108, and an outlet side of auxiliary condenser 108 is connected to the auxiliary liquid line 110. Auxiliary liquid line 110 taps the main liquid line 52 via a tee 112, with a check valve 114 being disposed in auxiliary liquid line 110 to prevent flow from the main liquid line 52 to the auxiliary condenser 108.

Figure 2:
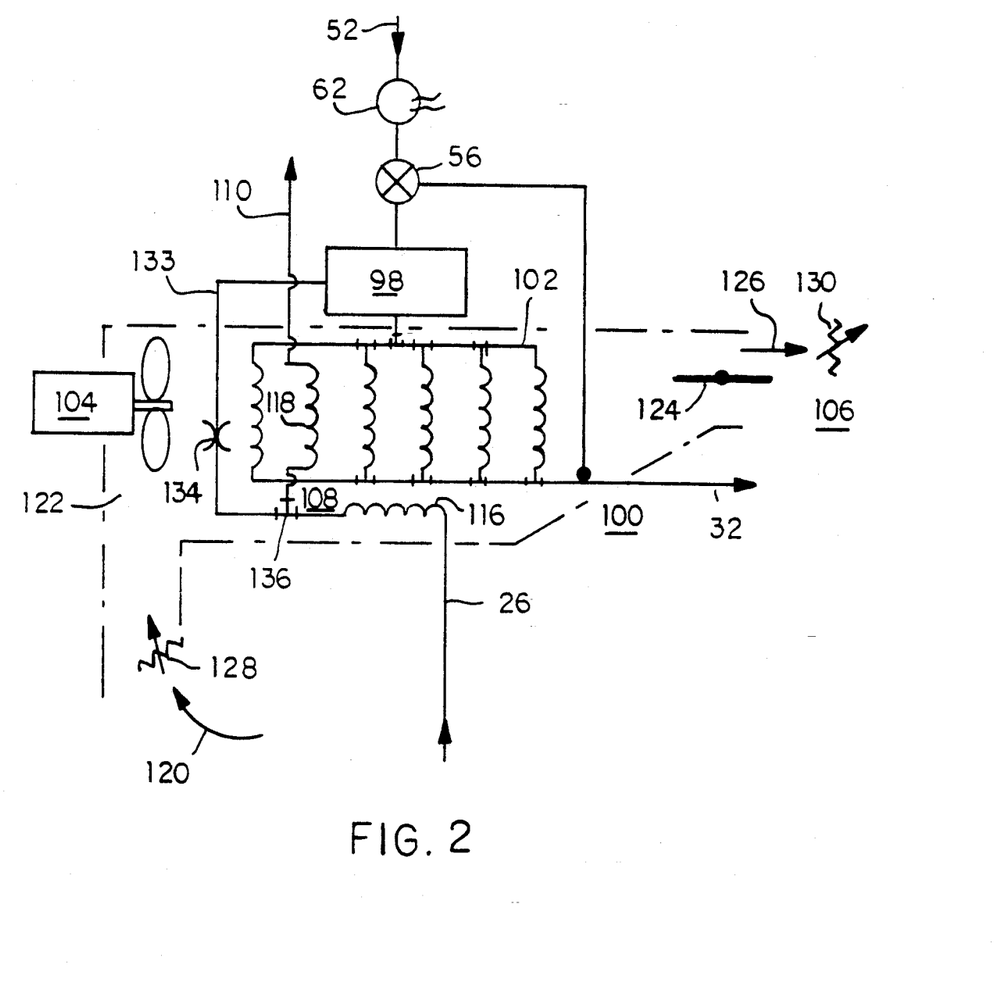
FIG. 2 schematically illustrates a more detailed arrangement for implementing the portion of the apparatus shown in FIG. 1 which is directly associated with the space to be conditioned.

In a preferred embodiment of the invention the auxiliary condenser 108 is divided into first and second serially connected sections 116 and 118 which respectively function as a defrost pan heater coil and a heating coil for adding heat to conditioned space 106. FIG. 2 is a schematic representation of a suitable implementation of the evaporator means 100 and auxiliary condenser means 108 in which the heating coil 118 is implemented by using one row or refrigerant flow path of a plurality of rows or flow paths which make up the evaporator coil 102. Return air from conditioned space 106, indicated by arrow 120, is drawn into a plenum 122 by air mover means 104, and air is forced to flow through a plurality of refrigerant flow paths which include flow paths of evaporator coil 102 and one or more flow paths associated with auxiliary condenser 108, with heating coil 118 being one or move of the rows of heat exchanger tubes in a structure which makes up evaporator coil 102, as hereinbefore stated. The location of heating coil 118 relative to the air flow direction through plenum 122 depends upon the specific application of refrigeration system 10. If de-humidifying is a requirement of the application, a tube location or row close to the entering air would be selected, as illustrated in FIG. 2. If de-humidifying is not a requirement, the selected row may be centered to enhance a defrosting cycle of evaporator coil 102. Even when heating coil 118 is close to the entering side of the air flow, however, defrosting is rapid, as a controllable defrost damper 124, controlled by electrical control 38, is closed during defrost, which circulates air rapidly about all of the rows of the tube bundle which makes up the evaporator coil 102, spreading heat from the heating coil 118 rapidly to all rows of the structure. The discharge or conditioned air, indicated by arrow 126, is forced to flow back into conditioned space 106 by air mover means 104. Return air and discharge air temperature sensors 128 and 130 provide control signals for electrical control 38. As shown in FIG. 1, an ambient air temperature sensor 132 may also provide an input to electrical control 38.

Figure 6:
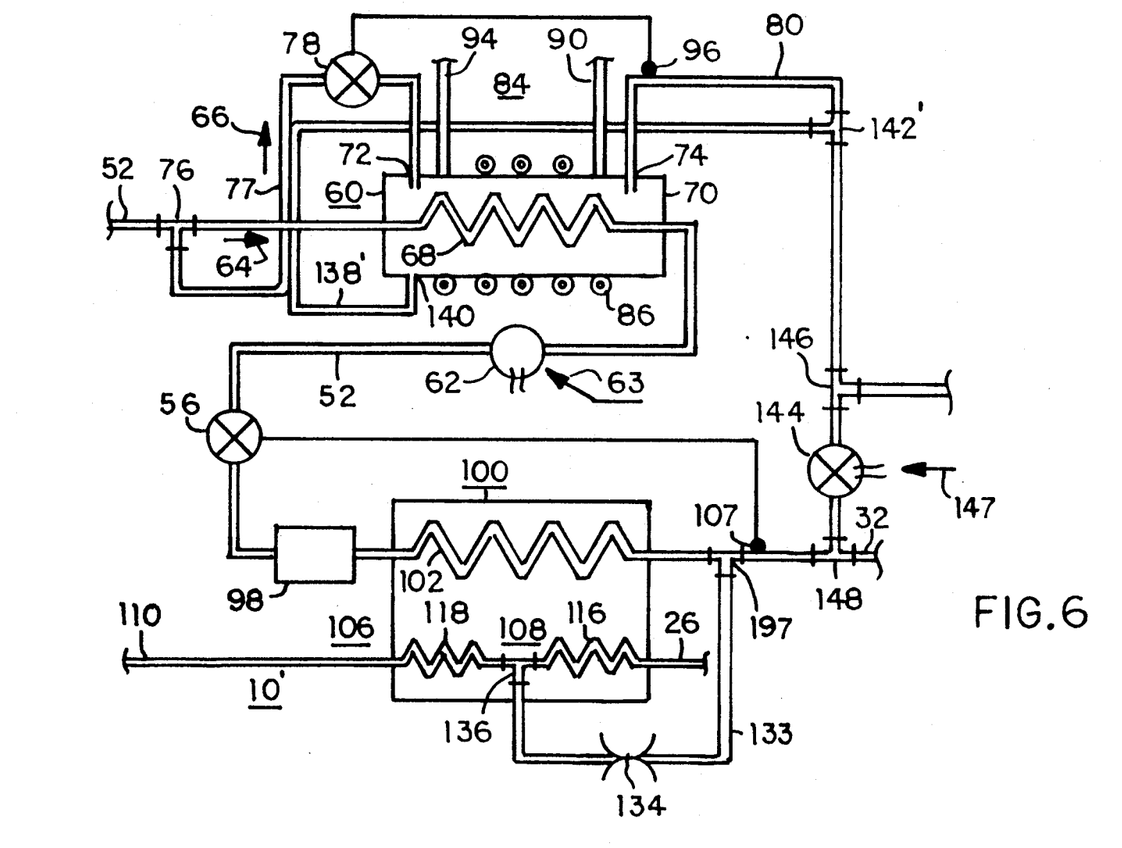
FIG. 6 illustrates other modifications of the refrigeration system shown in FIG. 1, according to the teachings of the invention.

In a desirable embodiment of the invention a refrigerant vent line 133 is provided, with vent line 133 having a predetermined orifice size, as indicated at 134. The vent line 133 is connected to apply suction pressure to the heating circuit 42 during a cooling cycle, to enhance the cooling cycle without adding to the overall refrigerant requirements of the system, by forcing refrigerant trapped in the heating circuit 42 into the cooling circuit 40. Refrigerant vent line 133 is connected between the heating circuit 42, which includes the circuit between three-way valve 30 and check valve 114, i.e., the second hot gas line 26, auxiliary condenser 108, and auxiliary liquid line 118, and the low pressure side of the cooling circuit 40, i.e., between the outlet side of evaporator expansion valve 56 and suction port S of compressor 12. In a preferred embodiment of the invention the defrost pan coil 116 is connected in series with the heating coil 118, and the refrigerant vent line 133 is connected from a junction or tee 136 between coils 116 and 118 to one of two predetermined points. In the embodiment of the invention shown in FIG. 1, the vent line 133 is connected to the refrigerant distributor 98. FIG. 6, to be hereinafter explained, illustrates the other predetermined point. These preferred arrangements have the advantages of minimizing the length of the vent line 133, and of providing defrosting of the vent line 133 during a defrost cycle. Since during a heating/defrost cycle the vent line 133 will create a capacity loss, the vent orifice 134 is preferably selected to be in a range of about 0.03 to 0.1 inch (0.8–2.5 mm), to minimize this capacity loss during a heating/defrost cycle.

In another desirable embodiment of the invention a compressor oil drain line 138 is connected from a low point 140 of shell 70 to one of two predetermined points. In the embodiment of the invention shown in FIG. 1, the oil drain line is connected to a still lower point, elevation-wise, on auxiliary suction line 80, with the lower elevation connection to auxiliary suction line 80 being indicated by tee 142. FIG. 6, to be hereinafter explained, illustrates the other predetermined point, which is a higher point, elevation-wise, on the auxiliary suction line 80 than the drain point 140. Compressor oil that is carried out into the system with the hot gas discharge from compressor 12 is at least partially miscible with liquid refrigerant in shell 70. Compressor oil which collects in shell 70 decreases the heat transfer efficiency between the flooded type evaporation taking place in shell 70 and heat exchanger coil 68. In the FIG. 1 embodiment of the drain line 138, drain line 138 was found to function well when constructed using tubing having an outside diameter (OD) of 0.25 inch (6.35 mm) and an orifice of 0.09 inch (2.3 mm). Drain line 138 thus provides the advantage of reducing the concentration of compressor oil in shell, increasing the heat transfer efficiency by 20% to 60%, depending upon the current running condition. Drain line 138 also returns a metered flow of liquid refrigerant to compressor 12, injecting the oil and liquid refrigerant into the intermediate pressure port IP. The metered amount of liquid refrigerant evaporates and cools the compressor, maintaining the discharge temperature of compressor 12 within a desirable limit.

As is common with compressors which have an intermediate pressure port IP, a n.c. controllable valve 144, called an economizer by-pass valve, is provided, which by-passes economizer refrigerant vapors to the suction port P when open. By-pass valve 144 is operably controlled by electrical control 38 via means indicated generally by arrow 147. Valve 144 may be internal to compressor 12, or external, as illustrated, with valve 144 being connected between tees 146 and 148 which respectively tap the auxiliary and main suction lines 80 and 32. A normal duty for economizer by-pass valve 144 is to be open during a heating/defrost cycle, to preclude any limitation on compressor pumping capability. During a heating/defrost cycle the normal flow to suction port S is closed. If compressor 12 pumps only through the intermediate pressure port IP the pumping capability may be limited, and it also pulls a vacuum on the main suction line. An open line between the auxiliary and main suction lines, via the open by-pass valve 144 thus eliminates these problems. By-pass valve 144 may also be opened during a cooling cycle as part of a temperature control algorithm, to unload compressor 12 for temperature control in the conditioned space 106 is the selected set point temperature is approached. The set point temperature of conditioned space 106 is selected on a set point temperature selector 145, which provides an input to electrical control 38.

In a desirable embodiment of the invention economizer by-pass valve 144 provides another function, engine load management, when prime mover 14 is an internal combustion engine. It is desirable that the temperature of the engine coolant and the exhaust temperature be maintained within reasonable limits. With excessive load on engine 14, especially during high ambient temperatures, it would be desirable to unload the engine 14 to maintain the desired limits. Thus, according to the teachings of the invention, load on engine 14 is monitored, and when it exceeds a predetermined value, by-pass valve 144 is opened by electrical control 38, and valve 144 remains open until the monitored load falls below a predetermined smaller value. Load on engine 14, for example, may be monitored by monitoring the compressor discharge pressure A discharge pressure sensor 150 provides an indication of the compressor discharge pressure to electrical control 38. When the discharge pressure reaches a predetermined value, for example a value of 360 psig (2482 kPa gauge) for R22 refrigerant, electrical control 38 energizes economizer by-pass valve 144 to open it and unload engine 14. When the discharge pressure drops to a predetermined value, such as 314 psig (2165 kPa gauge) for R22, electrical control 38 de-energizes by-pass valve 144, closing it. Other indications of engine load may be used, for example engine coolant temperature, as sensed by a temperature sensor 152 associated with an engine coolant circuit 154. An engine coolant temperature rise to 215° F. (101° C.), for example, may be used to initiate opening of valve 144, while a temperature drop to 200° F. (93° C.) may initiate closing. Engine exhaust temperature may also be used to indicate engine load, as sensed by a temperature sensor 156 associated with an exhaust conduit 158. An exhaust temperature rise to 850° F. (454° C.), for example, may be used to initiate opening of valve 144, while a temperature drop to 800° F. (426° C.) may initiate closing.

Engine coolant is used in another embodiment of the invention to cool the compressor oil. When compressor 12 is compressing at high pressure ratios and the specific heat ratio of the refrigerant is high, compressor 12 needs some cooling to limit the discharge temperature so neoprene or similar 0-ring seals may be used with the discharge service valve 22. Compressor cooling is achieved by taking oil from the compressor 12, cooling the oil in an oil cooler 160, and injecting the oil back into compressor 12 at an intermediate point, which operation also lubricates the shaft seal. The engine coolant is preferably a solution of ethylene glycol and water. It would be desirable to cool both the engine and compressor oil with a single thermostat, even though the engine and compressor have different cooling needs. Neither the compressor 12 nor the engine 14 should be too hot or too cold, with the compressor 12 generally heating up more quickly than engine 14 during most operating conditions.

More specifically, a compressor oil cooler 160 having an inlet 161 and an outlet 163 is provided which has a heat exchanger coil 162 connected to compressor oil sump 164 via conduits 166 and 168. A water jacket 170 surrounds heat exchanger coil 162, with water jacket 170 being connected to the engine coolant circuit 154. Engine coolant circuit 154 includes a thermostat 172, a radiator 174, and an expansion tank 176, as well as the hereinbefore mentioned coolant pump 92. Engine coolant is indicated at 177 in expansion tank 176. As illustrated, water jacket 170 may be connected to receive coolant from thermostat 172 via a conduit 178, and to return coolant to pump 92 via a conduit 180.

Figure 3:
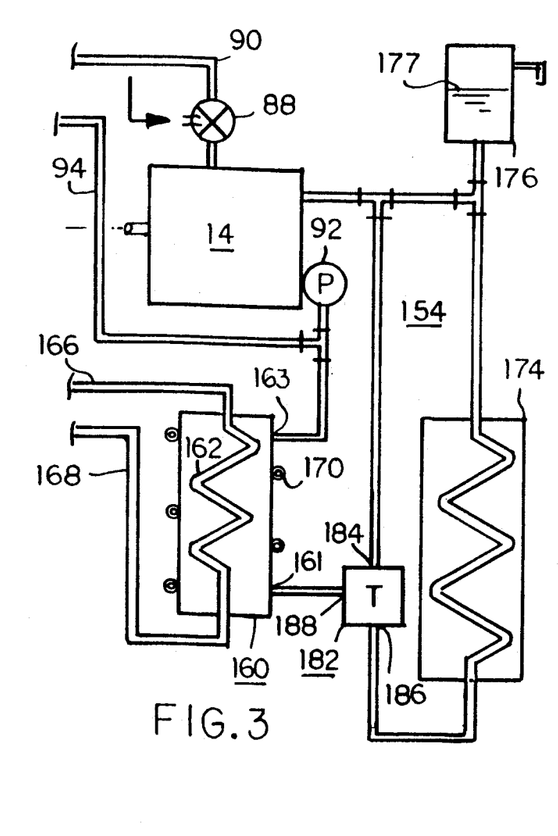
FIG. 3 illustrates a modification of the refrigeration system shown in FIG. 1, related to the cooling of a lubricant utilized by a refrigerant compressor, utilizing engine coolant and a single thermostat of the by-pass type.
Figure 4:
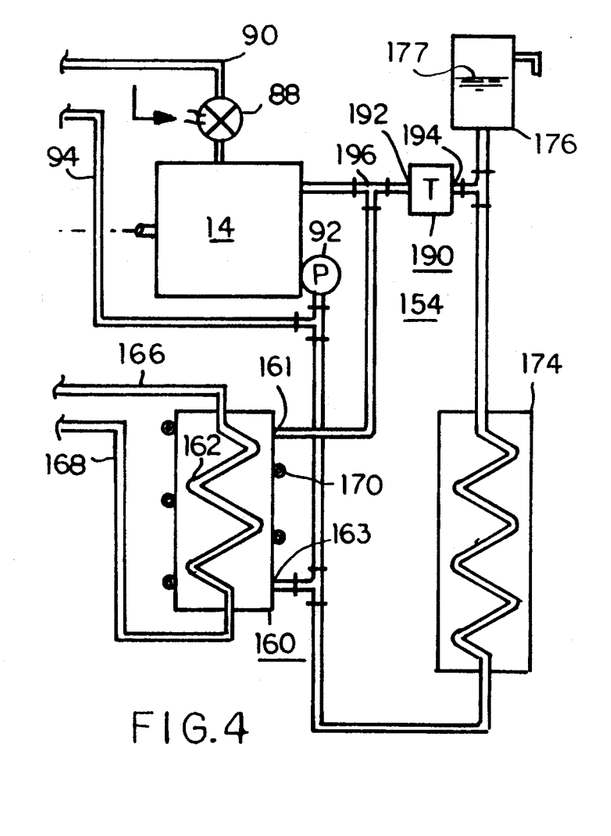
FIG. 4 illustrates another modification of the refrigeration shown in FIG. 1, related to the cooling of a lubricant utilized by a refrigerant compressor, utilizing engine coolant and a single thermostat of the choke type.

FIGS. 3 and 4 illustrate desirable embodiments of the invention related to connecting oil cooler 160 into the engine coolant circuit 154. FIG. 3 relates to the use of a thermostat 182 of the by-pass type. By-pass thermostat 182 has first and second inlets 184 and 186 and an outlet 188. By-pass thermostat initially blocks inlet 186, causing all of the coolant to by-pass radiator 174 until the temperature of the coolant rises to a predetermined value, at which point inlet 186 starts to open and inlet 184 starts to close. At a predetermined higher temperature thermostat inlet 184 will be substantially closed and inlet 186 will be substantially completely open, and all of the coolant will circulate through radiator 174. In order to insure that there is always a constant flow of coolant through the oil cooler 160, independent of the position of thermostat 182 at any instant, water jacket 170 is connected to the outlet 188 of thermostat 186, downstream from the thermostat 182 and radiator 174.

FIG. 4 illustrates an arrangement which utilizes a thermostat 190 of the choke type, having a single inlet 192 and a single outlet 194. Choke type thermostat 190 is substantially totally closed below a predetermined temperature, and when the predetermined temperature is reached, it starts to open, reaching a fully open position at a predetermined higher temperature. Instead of connecting oil cooler 160 downstream from radiator 174 and thermostat 182, as in the FIG. 3 embodiment, in the FIG. 4 embodiment oil cooler 160 is connected on the upstream side of thermostat 190, i.e., at a tee 196 which taps the liquid coolant circuit 154 prior to inlet 192 of thermostat 190. Thus, oil cooler 160 receives coolant flow regardless of the internal flow position of thermostat 190.

In order to construct and operate refrigeration system 10 with the features hereinbefore described, with economical sizing of the various heat exchangers and prime mover 14 relative to the compressor 12, and at the same time keep compressor discharge pressure and temperature, and engine load under control, some type of capacity control is desirable, in addition to the hereinbefore described optional engine load management use of the economizer by-pass valve 144. The most simple way to accomplish this is to introduce a pressure drop on the low pressure side of refrigeration system, i.e., on the suction side, such as with either a suction line throttling valve or a maximum operating pressure (MOP) evaporator expansion valve. However, to keep compressor discharge pressure and temperature and engine load under control with a suction line throttling valve or with a MOP evaporator expansion valve, one of the modes, cooling or heating/defrost, has to suffer with too large a restriction, as the desirable pressure drops are different for the two modes.

In a desirable embodiment of the invention a compromise in suction pressure control does not have to be made, without adding an additional valve, by providing MOP expansion valves for both the evaporator expansion valve 56 and the economizer expansion valve 78, each with a maximum operating pressure setting which is optimum for the associated operating mode. The evaporator MOP expansion valve 56 thus has a relative low setting, compared with the setting of economizer MOP expansion valve, with the evaporator MOP expansion valve 56 controlling the maximum compressor operating pressure during a cooling cycle, and with the economizer MOP expansion valve 78 controlling the maximum compressor operating pressure during a heating/defrosting cycle. With R22 refrigerant, for example, the main MOP expansion valve 56 would normally be set to provide a maximum pressure somewhere in a range of 10 psia to 50 psia (68.96 kPa absolute to 344.7 kPa absolute), while the economizer MOP expansion valve 78 would normally be set to provide a maximum pressure somewhere in a range of 60 psia to 100 psia (413.7 kPa absolute to 689.5 kPa absolute.

Figure 5:
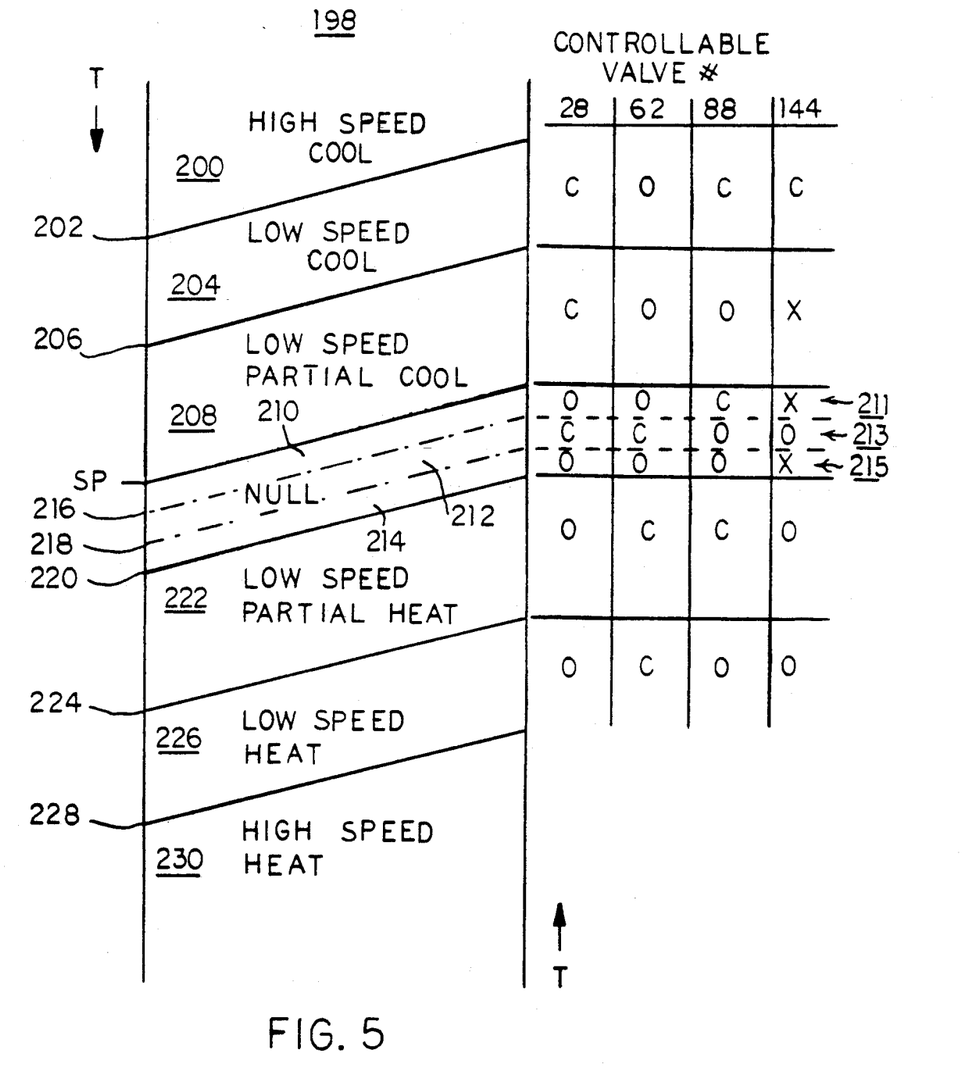
FIG. 5 illustrates a control algorithm having heating, cooling and null operating modes which are implemented according to the teachings of the invention.

FIG. 5 illustrates a control algorithm 198 having operating modes which are implemented according to the teachings of the invention, including a plurality of selectable null operating modes which smoothly maintain the temperature of conditioned space 106 in a null temperature range close to the selected set point temperature without shutting down the prime mover 14 or compressor 12. This arrangement assures constant air flow by evaporator air mover means 104 at all times, maintaining a substantially uniform temperature throughout conditioned space 106. Thus, the temperature of conditioned space 106 may be controlled very close to the selected set point temperature without danger of top freezing of a perishable cargo stored therein.

The left hand side of control algorithm 198 of FIG. 5 illustrates the control error change points between operating modes with a falling temperature in conditioned space 106, while the right hand side illustrates the control error change points for a rising temperature in conditioned space 106. Electrical control 38 computes the control error as a function of the difference between the temperature of the conditioned space 106, as sensed by either, or both, of the temperature sensors 128 and 130, and the selected set point temperature SP.

FIG. 5 also illustrates the open/closed patterns of controllable valves 28, 62, 88 and 144 which implement the different operating modes of the control algorithm. A "C" indicates the associated valve is closed, an "O" indicates the valve is open, and an "X" for by-pass valve 144 indicates that valve 144 may be opened or closed for additional fine tuning temperature control by loading and unloading compressor 12. Internal unloading of compressor 12, i.e., a reduction in displacement, such as with a slide valve, slot valve, or a lift valve, may also be used to obtain fine temperature control, as is well known in the art.

It will be assumed that the temperature of conditioned space 106 is in the stage of initial pulldown, and thus refrigeration system 10 will be in full or maximum cool. When prime mover 14 is an internal combustion engine, the engine speed is usually controlled by electrical control 38 between two speeds, called high speed and low speed, with temperature pull-down being initiated with a high speed cool mode 200, to obtain maximum cooling. Pilot solenoid valve 28 will be closed, causing three-way valve 30 to select the cooling circuit 40, liquid line valve 62 will be open, to enable evaporator coil 102 to function in a cooling mode, engine coolant valve 88 will be closed, preventing heat from being applied to economizer heat exchanger 60, and economizer by-pass valve 144 will be closed. Thus, liquid, high pressure refrigerant will be subcooled in heat exchanger coil 68 by the expanding, flooded evaporating state of the refrigerant in the second refrigerant flow path defined by shell 70. Refrigerant returns to compressor 12 via both the suction port S and the intermediate pressure port IP.

When the control error drops to a point indicated at 202, engine 14 is switched to the lower of its two standard operating speeds, without change in the controllable valve open/closed pattern, entering a low speed cool operating mode 204.

At a still smaller control error, indicated at point 206, a low speed partial or reduced cooling mode 208 is initiated by opening engine coolant valve 88. Thus, the subcooling of the high pressure liquid refrigerant in heat exchanger coil 68 is reduced, reducing the cooling rate of conditioned space 106 so the set point temperature SP is approached at a slower, more controlled rate.

When the set point temperature SP is reached, a null temperature range adjacent to the set point temperature SP is entered, which, in a preferred embodiment of the invention is divided into a plurality of different null operating modes, such as first, second and third operating modes 210, 212, and 214, with each null operating mode being respectively implemented by different open/closed patterns 211, 213 and 215 of controllable valve positions. The first null mode 210 is initiated at set point SP, the second null operating mode 212 is initiated at a slightly larger control error indicated at point 216, and the third null operating mode 214 is initiated at a still larger control error indicated at point 218. The prime mover 14 and compressor 12 remain operational during all three null operating modes, with the engine 14 remaining at the low speed setting.

In the first null mode 210, which is closest to set point SP, both heating and cooling takes place in evaporator means 100, with the emphasis being on cooling to prevent a quick return to the low speed partial cool mode 208. The emphasis on cooling also enables some dehumidifying to take place. The first null operating mode 210 is implemented by opening pilot solenoid valve 28 to switch the flow of hot compressor discharge gas to the heating circuit 42, while maintaining liquid line valve 62 in an open position to allow cooling to take place in evaporator coil 102. In other words, the flow path includes the second hot gas line 26, the auxiliary condenser 108, receiver 50, both flow paths 64 and 66 through economizer heat exchanger 60, subcooling the liquid refrigerant flowing through heat exchanger coil 68, expansion valve 56, and evaporator coil 102, with refrigerant being returned to both the suction port S and the intermediate pressure port IP.

In the second null mode 212, which is midway between the control errors which will terminate the null operating modes, no cooling or heating takes place in evaporator means 100, while engine coolant 177 is circulated through the water jacket 86 to keep the refrigerant in shell 70 fully evaporated for return to compressor 12, while simultaneously providing a desirable cooling of the engine coolant. The second null operating mode 212 is implemented by closing pilot solenoid valve 28, to switch the hot compressor discharge gas back to the first hot gas line 24, which prevents auxiliary condenser 108 from adding heat to conditioned space 106, by closing liquid line valve 62, which prevents evaporator coil 102 from removing heat from conditioned space 106, and by opening engine coolant valve 88, to enable engine coolant to give up heat to the refrigerant in shell 70. By-pass valve 144 may also be opened to prevent the suction side of refrigeration system 10 from being pulled down into a vacuum.

Thus, in the second null operating mode 212 the refrigerant flow circuit includes hot gas lines 18 and 24, main condenser 46, receiver 50, the second flow path 66 through economizer heat exchanger means 60, and the auxiliary and main suction lines 80 and 32.

The third null operating mode 214 again provides both heating and cooling in evaporator means 100, similar to the first null operating mode 210, with more heat being added to the refrigerant than in the first null operating mode 204, to attempt to maintain the temperature of conditioned space 106 in the null temperature zone, by allowing engine coolant valve 88 to remain open as the operating mode changes form null mode 212 to null mode 214. Thus, the third null operating mode 214 is implemented by opening pilot solenoid valve 28, to select the heating circuit 42, by opening liquid line solenoid valve 62, and by allowing engine coolant valve 88 to remain open. The refrigerant flow path is the same as described relative to the first null operating mode 204, with less subcooling of the liquid refrigerant in heat exchanger coil 68. Since some cooling takes place in the evaporator means 100, some dehumidifying also takes place.

Thus, at any given instant when the control error is close to the set point temperature, a null related operating mode is selected which will attempt to match the heat loss or gain of conditioned space 106 with the heat being added to, or removed from, the conditioned space by the evaporator coil 102 and the auxiliary condenser 108.

If the third null operating mode 214 does not keep the control error from increasing, indicating still more heat is required than is being provided in the third null operating mode 214, a control error value indicated at 220 initiates a low speed partial heating mode 222 which allows pilot solenoid valve 28 to remain open while liquid line valve 62 and engine coolant valve 88 are closed. Economizer by-pass valve 144 may also be opened to prevent limiting compressor pumping capacity and prevent a vacuum from being pulled in the main suction line 32. The refrigerant flow path includes hot gas lines 18 and 26, auxiliary condenser 108, auxiliary liquid line 110, receiver 50, the second refrigerant path 66 through economizer heat exchanger 60, and both the auxiliary and main suction lines 80 and 32.

If the control error continues to increase, reaching a value indicated at point 224, a higher heating rate low speed heat mode 226 is entered which adds additional heat by opening engine coolant valve 88. Pilot solenoid valve 28 and by-pass valve 144 remain open and liquid line valve 62 remains closed. The refrigerant flow path is the same as the partial heat operating mode 222.

If the control error continues to increase, reaching a value indicated at point 228, maximum heating is achieved by switching engine 14 to the higher of the two operating speeds, i.e., to a high speed heat operating mode 230. The valve open/closed pattern remains the same as in the low speed heat operating mode 226.

With a rising temperature in conditioned space 106, the operating modes just described are entered in reverse order, at slightly different control errors, i.e., higher up the control algorithm, to provide a hysteresis which prevents quickly switching back to the immediately prior operating mode.

FIG. 6 illustrates two desirable modifications of the refrigeration system 10 shown in FIG. 1 which may be used. Like reference numbers in FIGS. 6 and 1 indicate like components, with similar but modified components being given a prime mark in FIG. 6. A first modification relates to vent line 133. Instead of connecting the second end of vent line 133 to the refrigerant distributor 98, it may be connected to a tee 197 in the main suction line 32, downstream from evaporator coil 102, between evaporator coil 102 and thermal bulb 107. This arrangement has an advantage over the FIG. 1 embodiment in that it avoids the pressure drop associated with the distribution tubes in distributor 98.

A second modification relates to oil drain line 138. During transient testing of refrigeration system 10 as set forth in FIG. 1, system 10 was operated in a low speed cool mode with a 70° F. (21.1° C.) box, and with an ambient temperature of 120° F. (48.9° C.). Compressor 12 was then shut down. While compressor 12 was off the ambient was changed over a period of several hours to −25° F. (−31.67° C.) while the box was maintained at a temperature of 35° F. (1.67° C.). During such an operation, the refrigerant migrates to the cool ambient, and thus the condenser coil 46 usually cools the fastest of any component. This did not happen, however, as the oil return drain line 138, being connected to a point on auxiliary suction line, below outlet 140, allowed the economizer liquid to go to compressor 12. Thus, compressor 12 cooled faster than condenser coil 46, and most of the refrigerant liquid ended up in compressor 12. This severe a change in conditions would not be likely to happen during actual operating conditions. However, this undesirable result can be prevented, even during such a severe test by an oil drain arrangement shown in FIG. 6. Drain line 138' is directed to run in an upward direction, above the level of drain point 140, while in heat exchange relation with the liquid line 77, which causes the oil return line to function as an oil-refrigerant liquid lift or percolator. The tapping point tee 142' is located on auxiliary suction line 80 at an elevation above drain point 140. The FIG. 6 embodiment of drain line 138' will keep the oil concentration down in the economizer heat exchanger 60, and when compressor 12 is shut down, drain line 138' will not drain the liquid refrigerant into compressor 12. The high pressure, condensing temperature, liquid line 77 is subcooled by the partially boiling liquid refrigerant-oil solution. The vertical oil lift portion of drain line 138' may be provided by one or more 0.25 inch (6.35 mm) OD tubes, with the horizontal portion of the oil return line, or lines, being 0.375 inch (9.5 mm) OD tubing. The FIG. 6 embodiment of drain line 138' also has the temperature control advantage of the FIG. 1 embodiment, directly limiting the economizer suction temperature and indirectly limiting the discharge temperature.

We claim:

1. A method of operating a refrigeration system which achieves and holds a predetermined set point temperature in a conditioned space via cooling and heating cycles, with the refrigeration system including a refrigerant compressor which includes a suction port, an intermediate pressure port, and a discharge port, a compressor prime mover, a hot gas compressor discharge line, first and second hot gas lines, first controllable valve means having first and second positions which respectively connect the hot gas compressor discharge line to the first and second hot gas lines, a main condenser connected to the first hot gas line, an evaporator associated with the conditioned space, an evaporator expansion valve, -an auxiliary condenser associated with the conditioned space, which is connected to the second hot gas line, economizer heat exchanger means having first and second refrigerant flow paths, an economizer expansion valve which controls, the rate of refrigerant flow through the second refrigerant flow path, a main liquid line which connects the main condenser to the evaporator expansion valve via the first refrigerant flow path of the economizer heat exchanger means, an auxiliary liquid line which connects the auxiliary condenser to the economizer heat exchanger means, a main suction line which connects the evaporator to the suction port of the compressor, an auxiliary suction line which connects the second flow path of the economizer heat exchanger means to the intermediate pressure port of the compressor, second controllable valve means having first and second positions which respectively block and unblock the main liquid line, and third controllable valve means for selectively adding heat to the economizer heat exchanger means, characterized by the steps of:

providing at least one predetermined null related pattern of valve positions for the first, second and third controllable valve means, providing a null cycle when the temperature of the conditioned space is in a predetermined null temperature range adjacent to the predetermined set point temperature while maintaining operation of the refrigerant compressor, said step of providing a null cycle including the step of selecting said at least one predetermined null associated pattern of valve positions.

2. The method of claim 1 wherein the step of providing at least one predetermined null related pattern of valve positions provides a plurality of different patterns of null related valve positions, with the selecting step selecting that null related pattern which, at any given time, results in the net heat gain or loss of the conditioned space being substantially matched by the heat added to or removed from the conditioned space by the evaporator and auxiliary condenser.

3. The method of claim 2 wherein the selecting step selects a null related pattern which provides the steps of:
connecting the compressor hot gas discharge line to the second hot gas line via the first controllable valve means, condensing the hot gas and adding heat to the conditioned space via the auxiliary condenser,
directing condensed refrigerant from the auxiliary condenser through both the first and second refrigerant flow paths of the economizer heat exchanger means, and through the main liquid line via the second controllable valve means, evaporating the condensed refrigerant in the evaporator and removing heat from the conditioned space while simultaneously adding heat to the conditioned space via the auxiliary condenser, to provide a null cycle which tends to offset a net heat gain in the conditioned space.

4. The method of claim 2 wherein the selecting step selects a null related pattern which provides the steps of:
connecting the compressor hot gas discharge line to the second hot gas line via the first controllable valve means, condensing the hot gas and adding heat to the conditioned space via the auxiliary condenser,
adding heat to the economizer heat exchanger means via the third controllable valve means,
directing condensed refrigerant from the auxiliary condenser through both the first and second refrigerant flow paths of the economizer heat exchanger means, and through the main liquid line via the second controllable valve means, evaporating the condensed refrigerant in the evaporator and removing heat from the conditioned space while simultaneously adding heat to the conditioned space via the auxiliary condenser, to provide a null cycle which tends to offset a net heat loss in the conditioned space.

5. The method of claim 2 wherein the prime mover is cooled by a liquid coolant, with the liquid coolant being controlled by the third controllable valve means to selectively apply heat to the economizer heat exchanger means, and wherein the selecting step selects a null related pattern which provides the steps of:
connecting the compressor hot gas discharge line to the first hot gas line via the first controllable valve means, preventing refrigerant flow through the auxiliary condenser,
blocking the liquid line via the second controllable valve means, preventing refrigerant flow through the evaporator,
and adding heat to the economizer heat exchanger means via the third controllable valve means, resulting in removing heat from the prime mover coolant without adding heat to, or removing heat from, the conditioned space,
to provide a null cycle which neither adds nor removes heat from the conditioned space when there is substantially no heat gain or loss in the conditioned space.

6. The method of claim 1 including the step of providing refrigerant receiver means having an inlet and an outlet,
connecting the inlet to the main and auxiliary condensers via the main and auxiliary liquid lines,
providing check valve means in the main and auxiliary liquid lines between the receiver inlet and the main and auxiliary condensers,
and connecting the receiver outlet to the first and second refrigerant flow paths of the economizer heat exchanger means.

7. The method of claim 1 wherein the refrigeration system includes a heating refrigerant circuit which includes the second hot gas line, the auxiliary condenser, and auxiliary liquid line, and a low pressure cooling circuit between the evaporator expansion valve and the suction port, and including the step of providing a refrigerant vent orifice between said heating refrigerant circuit and said low pressure cooling circuit, to force refrigerant to flow from the heating circuit into the low pressure cooling circuit during a cooling cycle.

8. The method of claim 1 wherein the refrigeration system includes a refrigerant distributor between the evaporator expansion valve and evaporator, the auxiliary condenser includes a heating coil and a defrost pan heater, and including the steps of connecting the defrost pan heater in series with the heating coil, and providing a vent orifice from the junction of the defrost pan heater and auxiliary condenser to the refrigerant distributor, to force refrigerant in the auxiliary condenser to flow into an active refrigerant circuit during a cooling cycle.

9. The method of claim 1 wherein the refrigeration system includes a refrigerant distributor between the evaporator expansion valve and evaporator, the auxiliary condenser includes a heating coil and a defrost pan heater, and including the steps of connecting the defrost pan heater in series with the heating coil, and providing a vent orifice from the junction of the defrost pan heater and auxiliary condenser to the main suction line, to force refrigerant in the auxiliary condenser to flow into an active refrigerant circuit during a cooling cycle.

10. The method of claim 1 wherein the economizer heat exchanger means includes a shell which defines a portion of the second refrigerant flow path, with the shell having an inlet connected to the economizer expansion valve and an outlet connected to the auxiliary suction line, and wherein the shell includes oil carried into the system from the compressor, and including the step of connecting a drain line from a low point of the shell to a still lower point of the auxiliary suction line, returning compressor oil in the shell, along with a metered flow of liquid refrigerant, to the compressor, with oil removal improving heat transfer efficiency in the economizer heat exchanger and with the metered flow of refrigerant limiting the discharge temperature of the compressor.

11. The method of claim 1 wherein the economizer heat exchanger means includes a shell which defines a portion of the second refrigerant flow path, with the shell having an inlet connected to the economizer expansion valve and an outlet connected to the auxiliary suction line, and wherein the shell includes oil carried into the system from the compressor, and including the step of connecting a drain line from a low point of the shell to a higher point of the auxiliary suction line, running the drain line upwardly in heat exchange relation with the liquid line to percolate the oil-refrigerant mixture to provide a lifting force, returning compressor oil in the shell, along with a metered flow of liquid refrigerant, to the compressor, with oil removal improving heat transfer efficiency in the economizer heat exchanger and with the metered flow of refrigerant limiting the discharge temperature of the compressor.

12. The method of claim 1 including the steps of providing maximum operating pressure (MOP) valves for the evaporator and economizer expansion valves, controlling the maximum operating pressure during a cooling cycle with the evaporator MOP expansion valve, and controlling the maximum operating pressure during a heating cycle with the economizer MOP expansion valve.

13. The method of claim 12 including the step of providing a higher maximum operating pressure setting for the economizer MOP expansion valve than for the evaporator MOP expansion valve.

14. The method of claim 1 wherein a controllable by-pass valve is connected between the main and auxiliary suction lines, and including the step controlling the by-pass valve as a function of load on the compressor prime mover, opening the by-pass valve when the load reaches a predetermined value, and closing the bypass valve when the load drops to a predetermined value.

15. The method of claim 14 including the step of determining load on the compressor prime mover by monitoring the compressor discharge pressure, opening the by-pass valve when the discharge pressure reaches a predetermined value, and closing the by-pass valve when the discharge pressure drops to a predetermined value.

16. The method of claim 14 including the step of determining load on the compressor prime mover by monitoring the temperature of the prime mover, opening the by-pass valve when the temperature of the prime mover reaches a predetermined value, and closing the by-pass valve when the temperature of the prime mover drops to a predetermined value.

17. The method of claim 14 wherein the prime mover includes liquid coolant, and including the step of determining load on the compressor prime mover by monitoring the temperature of the liquid coolant, opening the by-pass valve when the coolant temperature reaches a predetermined value, and closing the by-pass valve when the coolant temperature drops to a predetermined value.

18. The method of claim 14 wherein the prime mover is an engine having exhaust gases, and including the step of determining load on the compressor prime mover by monitoring the temperature of the exhaust gases, opening the by-pass valve when the exhaust gas temperature reaches a predetermined value, and closing the by-pass valve when the exhaust gas temperature drops to a predetermined value.

19. The method of claim 1 wherein the prime mover is an engine having liquid engine coolant and an engine coolant flow circuit which includes a thermostat and a radiator, and the compressor includes a compressor oil cooler having an inlet and an outlet for connection to the coolant flow circuit, including the steps of:
providing a thermostat of the by-pass type, having first and second inlets and an outlet,
and connecting the outlet of the thermostat to the inlet of the compressor oil cooler, providing a constant flow of engine coolant to the oil cooler regardless of the relative flow rates into the first and second inputs of the thermostat.

20. The method of claim 1 wherein the prime mover is an engine having liquid engine coolant and an engine coolant flow circuit which includes a thermostat and a radiator, and the compressor includes a compressor oil cooler having an inlet and an outlet for connection to the coolant flow circuit, including the steps of:
providing a thermostat of the choke type, having a single inlet and a single outlet,
and connecting the inlet of the compressor oil cooler to the engine coolant flow circuit on the upstream side of the thermostat inlet, providing a constant flow of liquid engine coolant to the oil cooler regardless of the flow rate through the thermostat.

21. A refrigeration system which achieves and holds a predetermined set point temperature in a conditioned space via cooling and heating cycles, with the refrigeration system including a refrigerant compressor which includes a suction port, an intermediate pressure port, and a discharge port, a compressor prime mover, a hot gas compressor discharge line, first and second hot gas lines, first controllable valve means having first and second positions which respectively connect the hot gas compressor discharge line to the first and second hot gas lines, a main condenser connected to the first hot gas line, an evaporator associated with the conditioned space, an evaporator expansion valve, an auxiliary condenser associated with the conditioned space which is connected to the second hot gas line, economizer heat exchanger means having first and second refrigerant flow paths, an economizer expansion valve which controls the rate of refrigerant flow through the second refrigerant flow path, a main liquid line which connects the main condenser to the evaporator expansion valve via the first refrigerant flow path of the economizer heat exchanger means, an auxiliary liquid line which connects the auxiliary condenser to the economizer heat exchanger means, a main suction line which connects the evaporator to the suction port of the compressor, an auxiliary suction line which connects the second flow path of the economizer heat exchanger means to the intermediate pressure port of the compressor, second controllable valve means having first and second positions which respectively block and unblock the main liquid line, and third controllable valve means for selectively adding heat to the economizer heat exchanger means, characterized by:
means providing at least one predetermined null related pattern of valve positions for the first, second and third controllable valve means,
and means initiating a null cycle when the temperature of the conditioned space is in a predetermined null temperature range adjacent to the predetermined set point temperature while maintaining operation of the refrigerant compressor,
said means which initiates a null cycle utilizing said at least one predetermined null associated pattern of valve positions.

22. The refrigeration system of claim 21 wherein the means which provides the at least one predetermined null related pattern of valve positions provides a plurality of different patterns of null related valve positions, with the means which initiates a null cycle selecting that null related pattern which, at any given time, results in the net heat gain or loss of the conditioned space being substantially matched by the heat added to or removed from the conditioned space by the evaporator and auxiliary condenser.

23. The refrigeration system of claim 22 wherein the means which initiates a null cycle includes:
means operating the first controllable valve means to the second position thereof, to connect the compressor hot gas discharge line to the second hot gas line, to condense the hot gas and add heat to the conditioned space via the auxiliary condenser,
means operating the second controllable valve means to the second position thereof, to direct condensed refrigerant from the auxiliary condenser through both the first and second refrigerant flow paths of the economizer heat exchanger means, and through the main liquid line, to evaporate the condensed refrigerant in the evaporator and remove heat from the conditioned space while simultaneously adding heat to the conditioned space via the auxiliary condenser, to provide a null cycle which tends to offset a net heat gain in the conditioned space.

24. The refrigeration system of claim 22 wherein the means which initiates a null cycle includes:
means operating the first controllable valve means the second position thereof, to connect the compressor hot gas discharge line to the second hot gas line, to condense the hot gas and add heat to the conditioned space via the auxiliary condenser,
means operating the third controllable valve means to add heat to the economizer heat exchanger means,
means operating the second controllable valve means to the second position thereof, to direct condensed refrigerant from the auxiliary condenser through both the first and second refrigerant flow paths of the economizer heat exchanger means, and through the main liquid line, to evaporate condensed refrigerant in the evaporator and remove heat from the conditioned space while simultaneously adding heat to the conditioned space via the auxiliary condenser, to provide a null cycle which tends to offset a net heat loss in the conditioned space.

25. The refrigeration system of claim 22 wherein the prime mover is cooled by a liquid coolant, with the liquid coolant being controlled by the third controllable valve means to selectively apply heat to the economizer heat exchanger means, and wherein the means which initiates a null cycle includes:
means operating the first controllable valve means to the first position thereof, to connect the compressor hot gas discharge line to the first hot gas line and prevent refrigerant flow through the auxiliary condenser,
means operating the second controllable valve means to the first position thereof, to block the liquid line and prevent refrigerant flow through the evaporator,
and means operating the third controllable valve means to add heat to the economizer heat exchanger means, to remove heat from the prime mover coolant without adding heat to, or removing heat from, the conditioned space,
to provide a null cycle which neither adds nor removes heat from the conditioned space when there is substantially no heat gain or loss in the conditioned space.

26. The refrigeration system of claim 21 wherein the refrigeration system includes refrigerant receiver means having an inlet and an outlet, and including:
means including the main and auxiliary liquid lines connecting the main and auxiliary condensers to the inlet of the refrigerant receiver means,
check valve means in the main and auxiliary liquid lines between the receiver inlet and the main and auxiliary condensers,
and means connecting the receiver outlet to the first and second refrigerant flow paths of the economizer heat exchanger means.

27. The refrigeration system of claim 21 wherein the refrigeration system includes a heating refrigerant circuit which includes the second hot gas line, the auxiliary condenser, and auxiliary liquid line, and a low pressure cooling circuit between the evaporator expansion valve and the suction port, and further including:
a refrigerant vent orifice connected between said heating refrigerant circuit and said low pressure cooling circuit, to force refrigerant to flow from said heating circuit into said low pressure cooling circuit during a cooling cycle.

28. The refrigeration system of claim 21 wherein the refrigeration system includes a refrigerant distributor connected between the evaporator expansion valve and evaporator, and the auxiliary condenser includes first and second sections, and further including:
means connecting the first and second sections of the auxiliary condenser in series to define a junction therebetween,
and a vent orifice connected between said junction and the refrigerant distributor, to force refrigerant in the auxiliary condenser to flow into an active refrigerant circuit during a cooling cycle.

29. The refrigeration system of claim 21 wherein the refrigeration system includes a refrigerant distributor connected between the evaporator expansion valve and evaporator, and the auxiliary condenser includes first and second sections, and further including:
means connecting the first and second sections of the auxiliary condenser in series to define a junction therebetween,
and a vent orifice connected between said junction and the main suction line, to force refrigerant in the auxiliary condenser to flow into an active refrigerant circuit during a cooling cycle.

30. The refrigeration system of claim 21 wherein the economizer heat exchanger means includes a shell defining a portion of the second refrigerant flow path, with the shell having an inlet connected to the economizer expansion valve and an outlet connected to the auxiliary suction line, with oil from the compressor being carried into the shell, and further including:
a drain line connected between a low point of the shell and a still lower point of the auxiliary suction line, returning compressor oil in the shell, along with a metered flow of liquid refrigerant, to the compressor, with the oil removal improving heat transfer efficiency in the economizer heat exchanger and with the metered flow of liquid refrigerant limiting the discharge temperature of the compressor.

31. The refrigeration system of claim 21 wherein the economizer heat exchanger means includes a shell defining a portion of the second refrigerant flow path, with the shell having an inlet connected to the economizer expansion valve and an outlet connected to the auxiliary suction line, with oil from the compressor being carried into the shell, and further including:

a drain line connected between a low point of the shell and a higher point of the auxiliary suction line, with said drain line being directed upwardly, in heat exchange relation with the auxiliary liquid line to provide a lifting force for a liquid refrigerant-oil mixture, returning compressor oil in the shell, along with a metered flow of liquid refrigerant, to the compressor, with the oil removal improving heat transfer efficiency in the economizer heat exchanger and with the metered flow of liquid refrigerant limiting the discharge temperature of the compressor.

32. The refrigeration system of claim 21 wherein the evaporator and economizer expansion valves are maximum operating pressure (MOP) valves having predetermined maximum operating pressure settings, with the evaporator MOP expansion valve controlling the maximum operating pressure during a cooling cycle, and with the economizer MOP expansion valve controlling the maximum operating pressure during a heating cycle.

33. The refrigeration system of claim 32 wherein the maximum pressure setting of the economizer MOP expansion valve is higher than the maximum pressure setting of the evaporator MOP expansion valve.

34. The refrigeration system of claim 33 including a controllable by-pass valve connected between the main and auxiliary suction lines, and further including:

means determining the load on the compressor prime mover, and control means controlling the by-pass valve as a function of load on the compressor prime mover, said control means opening the by-pass valve when the load reaches a predetermined value, and closing the by-pass valve when the load drops to a predetermined value.

35. The refrigeration system of claim 34 wherein the means which determines the load on the compressor prime mover monitors the compressor discharge pressure, with the control means opening the by-pass valve when the discharge pressure reaches a predetermined value, and closing the by-pass valve when the discharge pressure drops to a predetermined value.

36. The refrigeration system of claim 34 wherein the means which determines the load on the compressor prime mover monitors the temperature of the prime mover, with the control means opening the by-pass valve when the temperature of the prime mover reaches a predetermined value, and closing the by-pass valve when the temperature of the prime mover drops to a predetermined value.

37. The refrigeration system of claim 34 wherein the prime mover includes liquid coolant, and wherein the means which determines the load on the compressor prime mover monitors the temperature of the liquid coolant, with the control means opening the by-pass valve when the coolant temperature reaches a predetermined value, and closing the by-pass valve when the coolant temperature drops to a predetermined value.

38. The refrigeration system of claim 34 wherein the prime mover is an engine having exhaust gases, and wherein the means which determines the load on the compressor prime mover monitors the temperature of the exhaust gases, with the control means opening the by-pass valve when the exhaust gas temperature reaches a predetermined value, and closing the by-pass valve when the exhaust gas temperature drops to a predetermined value.

39. The refrigeration system of claim 21 wherein the prime mover is an engine having liquid engine coolant and an engine coolant flow circuit which includes a thermostat of the by-pass type, having first and second inlets and an outlet, and a radiator, and the compressor includes a compressor oil cooler having an inlet and an outlet for connection to the engine coolant flow circuit, and further including:

means connecting the outlet of the thermostat to the inlet of the compressor oil cooler, providing a constant flow of engine coolant to the oil cooler regardless of the relative flow rates into the first and second inputs.

40. The refrigeration system of claim 21 wherein the prime mover is an engine having liquid engine coolant and an engine coolant flow circuit which includes a thermostat of the choke type, having a single inlet and a single outlet, and a radiator, and the compressor includes a compressor oil cooler having an inlet and an outlet for connection to the engine coolant flow circuit, including:

means connecting the inlet of the compressor oil cooler to the engine coolant flow circuit on the upstream side of the thermostat inlet, providing a constant flow of liquid engine coolant to the oil cooler regardless of the flow rate through the thermostat.

* * * * *